June 15, 1965 H. W. MOORE 3,189,059

WINDING MACHINE

Filed Sept. 25, 1962 8 Sheets-Sheet 1

INVENTOR.
HARRY W. MOORE

BY Oyberg & Oyberg

HIS ATTORNEYS

INVENTOR.
HARRY W. MOORE
BY Dybvig & Dybvig
HIS ATTORNEYS

INVENTOR.
HARRY W. MOORE
BY Dybvig & Dybvig
HIS ATTORNEYS

INVENTOR.
HARRY W. MOORE
BY
Dybvig & Dybvig
HIS ATTORNEYS

INVENTOR.
HARRY W. MOORE
BY Dybvig & Dybvig
HIS ATTORNEYS

June 15, 1965 H. W. MOORE 3,189,059

WINDING MACHINE

Filed Sept. 25, 1962 8 Sheets-Sheet 6

INVENTOR.
HARRY W. MOORE

BY Dybvig & Dybvig

HIS ATTORNEYS

INVENTOR.
HARRY W. MOORE
BY Dybvig & Dybvig
HIS ATTORNEYS

June 15, 1965 H. W. MOORE 3,189,059

WINDING MACHINE

Filed Sept. 25, 1962 8 Sheets-Sheet 8

INVENTOR.
HARRY W. MOORE

BY Dybvig & Dybvig

HIS ATTORNEYS

United States Patent Office 3,189,059
Patented June 15, 1965

3,189,059
WINDING MACHINE

Harry W. Moore, 5051 Kittridge Road, Dayton 24, Ohio

Filed Sept. 25, 1962, Ser. No. 226,109
23 Claims. (Cl. 140—92.1)

This invention relates to a winding machine used in the mass production of stators. More particularly, this invention relates to a coil winding machine utilizing a dummy field member into which coils are deposited, the coils subsequently being transferred from the dummy field member to a stator frame. It is to be understood that the invention is not necessarily so limited. The term "stator" is used herein for convenience and the invention will be described with reference to a stator for a rotating field alternator. Those skilled in the art will realize, however, that the invention disclosed herein may be used to provide any of numerous electromagnetic devices with field or current carrying coils.

An object of this invention is to provide improved automatic and continuously operable mechanism for the mass production of stator assemblies.

Another object of this invention is the provision of an improved mechanism for providing stator frames with coils, which is relatively compact and simple in construction, yet rapid and reliable in operation.

A more specific object of this invention is the provision of a mechanism for providing stator frames with coils utilizing one or more pairs of dummy field members mounted on a common support, a single pair of such dummy field members being usable for winding polyphase stators.

Another object of this invention is the provision of a stator winding mechanism capable of winding coils on a plurality of stators simultaneously with the use of a single set of control and drive mechanisms.

Other objects and advantages reside in the construction of parts, the combination thereof, the method of manufacture and the mode of operation, as will become more apparent from the following description.

Referring to the drawings:

In FIGURE 1 and in many other figures, portions of the machine are broken away or omitted to disclose details thereof.

*General description*

This invention generally relates to a mechanism for providing a stator frame with field or current carrying coils in which the coils may be inserted into the stator frame in sets. One set of coils is wound upon a coil accumulator, herein called a dummy field member, and transferred from the dummy field member to coil receiving slots in a stator frame. After the first set of coils is inserted into the stator frame, relative rotation is induced between the stator frame and a dummy field member such that a second set of coils may be inserted into stator slots offset from the slots receiving the first set of coils. This system of placing the coils in stator frames can conveniently be used when the resulting stator assembly is to be a polyphase stator. For example, three sets of coils, one for each phase, would be placed into a stator frame for a three-phase stator. In my copending application, Serial No. 89,804, filed in the United States Patent Office on February 16, 1961, such a system for inserting coils into stator frames is described in greater detail.

Figure 1:
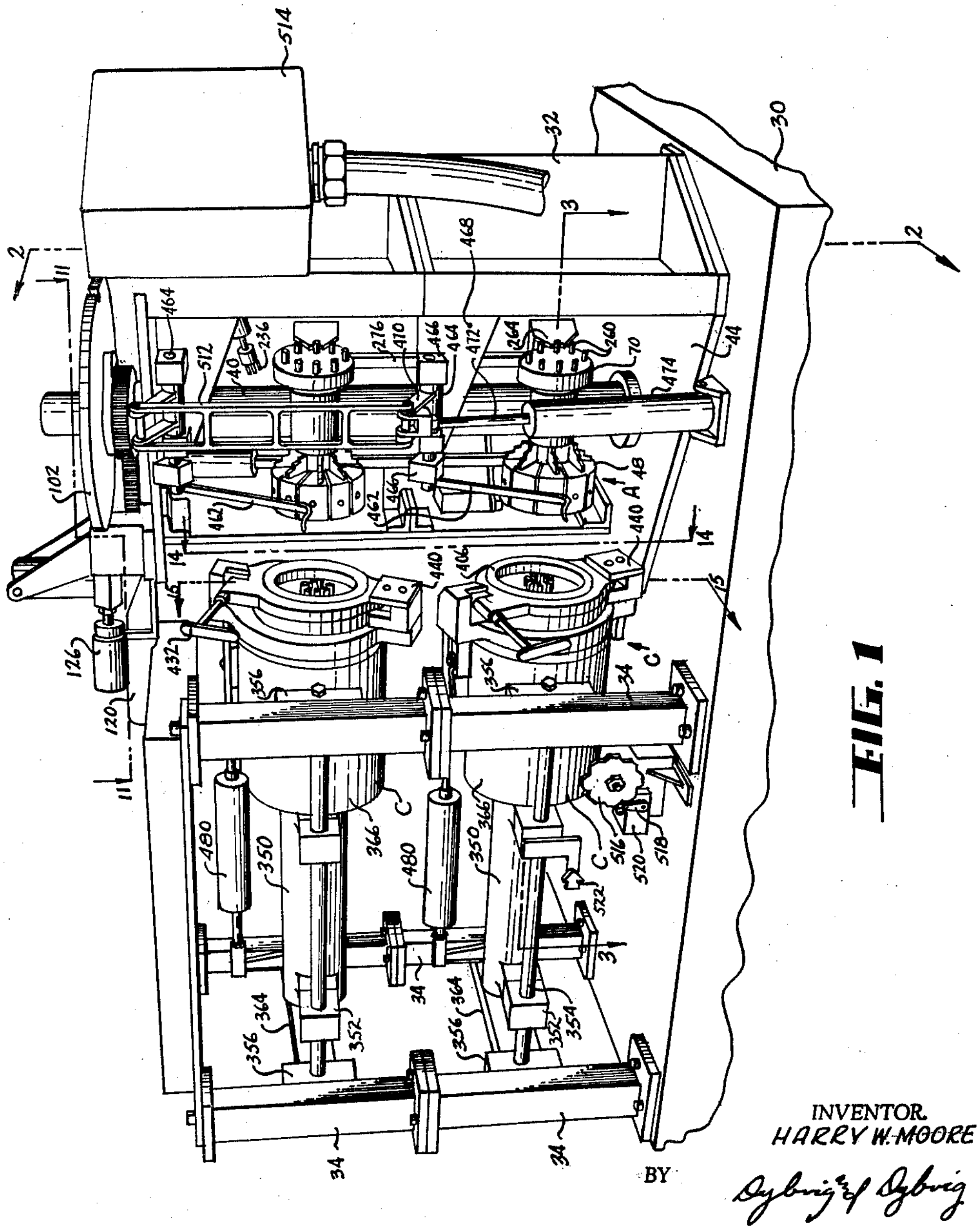
FIGURE 1 is a perspective view of a stator winding machine made in accordance with this invention.
Figure 2:
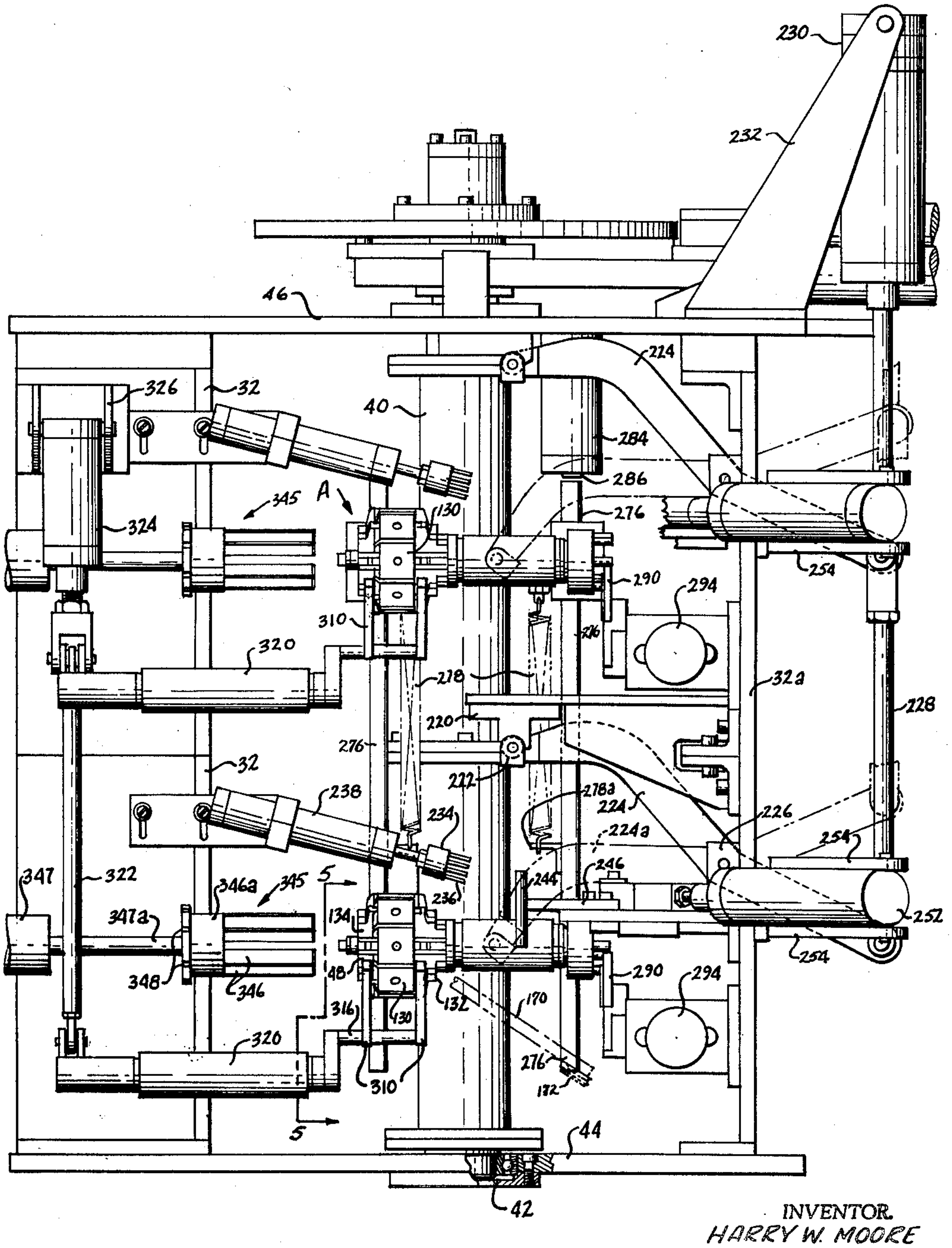
FIGURE 2 is a side elevational view of a portion of the machine of FIGURE 1, as viewed in the direction of arrows 2—2 thereof.
Figures 3, 9, 10:
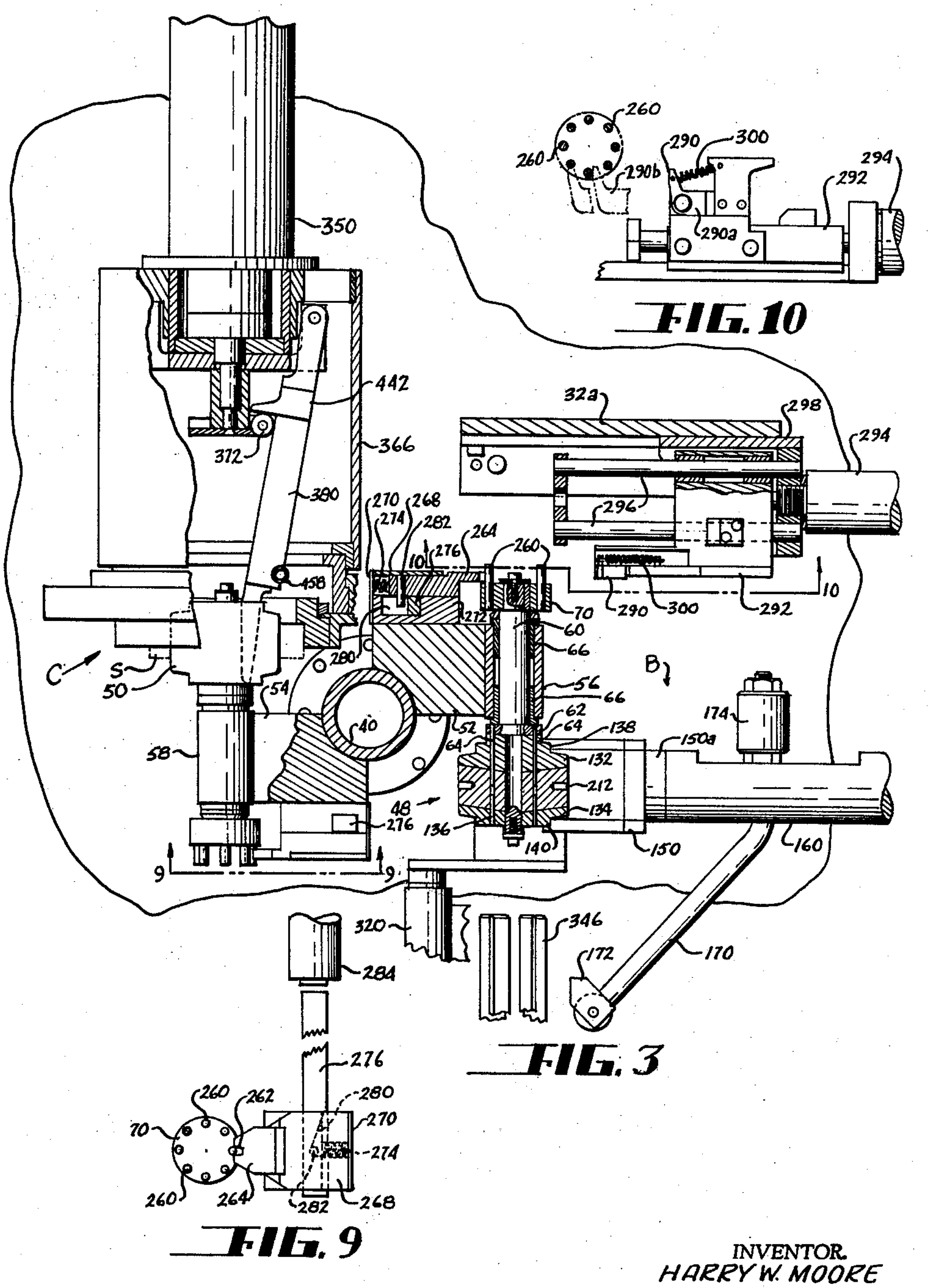
FIGURE 3 is a cross-sectional view taken along line 3—3 of FIGURE 1.
FIGURE 9 is a side elevational view viewed in the direction of arrows 9—9 of FIGURE 3, of structure for releasably locking a dummy field member in a predetermined position.
FIGURE 10 is a side elevational view, with portions in cross-section, of structure for indexing a dummy field member during a winding operation as viewed in the direction of arrows 10—10 of FIGURE 3.

A machine made in accordance with this invention is illustrated in FIGURES 1, 2 and 3, as including three basic units, namely a dummy field member assembly, generally designated A; a coil winding mechanism, generally designated B; and a coil transferring mechanism, generally designated C. The dummy field member assembly A includes a pair of dummy field members 48 and 50 and means to position one field member at a station in which coils are wound in the coil receiving slots therein. When a dummy field member receiving coils is in this position, the other dummy field member is positioned adjacent the coil transferring mechanism C whereby coils already deposited in the coil receiving slots therein are transferred to a stator frame. The dummy field member assembly further includes a mechanism in driving engagement with a support for the dummy field member for reversing the position of the dummy field members. Accordingly, while one dummy field member is receiving coils, coils are being transferred from the other dummy field member. This operation is continuously repeated.

The entire machine may be mounted upon a table or suitable platform 30 and supported thereon by suitable framework 32, supporting posts 34 and the like. In FIGURES 1 and 2, pairs of dummy field member assemblies A are illustrated as stacked one above the other as are pairs of the transferring mechanisms C shown in FIGURE 1. As will become more obvious from the ensuing description, still further units of assemblies A, B and C may be stacked one upon the other so that as many stator frames as desired may be provided with coils simultaneously. The two complete units illustrated in the drawings are substantially identical in function. Hence, for the most part, only one set of assemblies will be described in detail below. It should be understood throughout, however, that the units may be mounted in stacks and that the apparatus described herein is so designed that one set of drive and control members may be used to operate as many sets of assemblies A, B and C as desired.

*Dummy field member assembly*

As best illustrated in FIGURES 2 and 3, the dummy field member assembly A includes a vertical support post 40 journalled for rotation at its lower end, as illustrated at 42, in a base plate 44 mounted on top of the platform 30. The support post 40 is similarly journalled for rotation at its upper end within a cover plate 46. As illustrated in FIGURE 3, a pair of dummy field members 48 and 50 are mounted on opposite sides of the post 40 on parallel, horizontal axes which lie in a common plane transverse to the center line or axis of the post 40. The mounting for the members 48 and 50 includes a pair of support blocks 52, 54 respectively, fixedly connected to the post 40. Mounted on the outer ends of the support blocks 52, 54 are a pair of sleeves 56, 58 respectively, which sleeves receive dummy field member support shafts or axles 60 for rotation. In FIGURE 3, the mounting for the dummy field member 48 is shown in detail. Since the structure and function of both dummy field members is identical, the following description refers primarily to the member 48.

The shaft or axle 60 has an enlarged head portion 62 connected to the field member 48 as by pins 64. The axle 60 is received within bushings 66 extending in and beyond the end of the sleeve 58. An indexing head is mounted on the shaft 60 opposite the head portion 62 to which the dummy field member 48 is connected. The indexing head 70, as will be more fully described below, is used while coils are being inserted into coil receiving slots 72 (see FIGURE 4) located within the dummy field member 48. The construction of the indexing head 70 and the dummy field member 48 will be described in greater detail below.

Figures 11, 12, 13, 18:
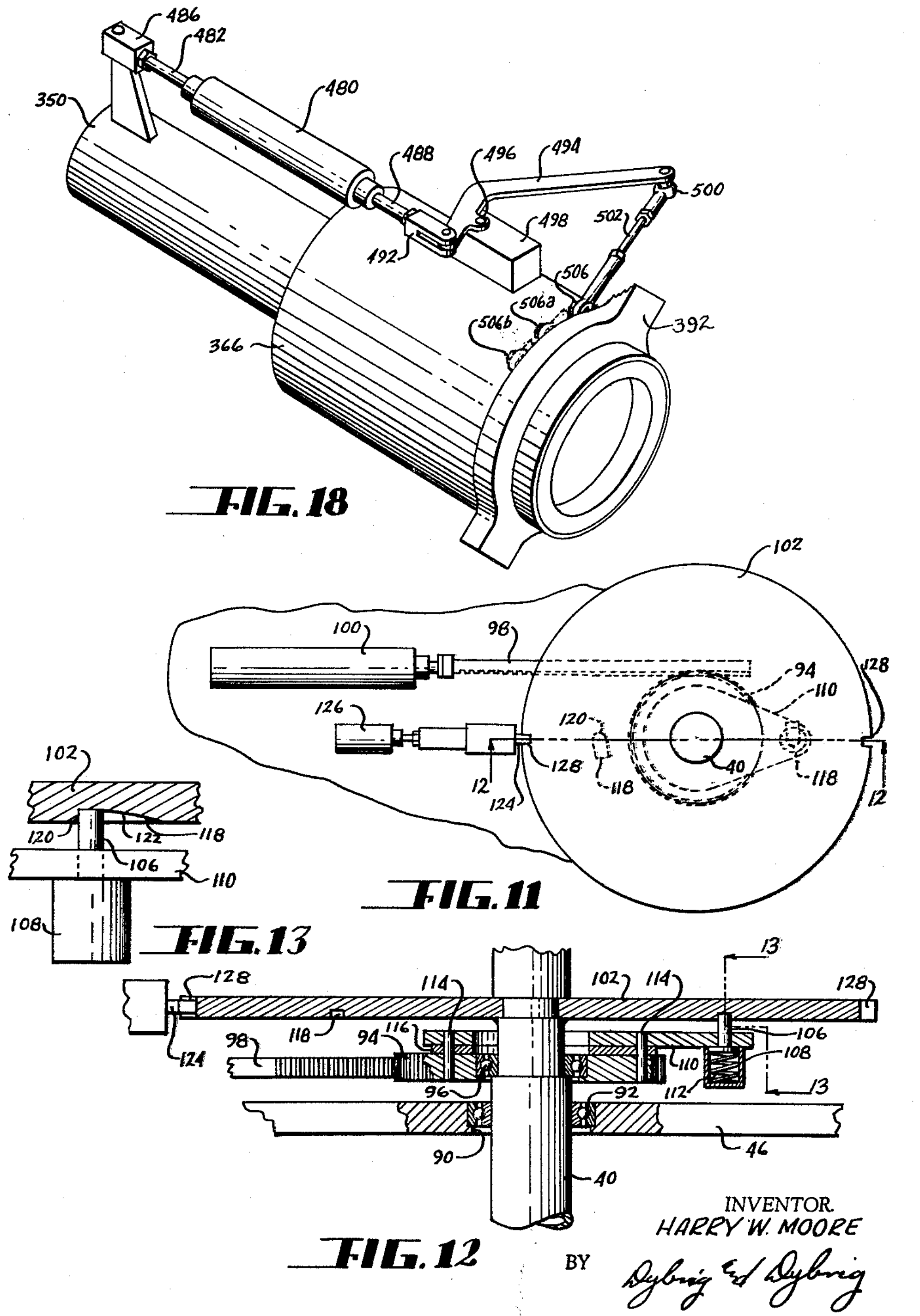
FIGURE 11 is a plan view of a portion of mechanism for controlling the position of a dummy field member as viewed in the direction of arrows 11—11 of FIGURE 1.
FIGURE 12 is a cross-sectional view of the mechanism of FIGURE 11 taken along line 12—12 thereof.
FIGURE 13 is a cross-sectional view of the mechanism of FIGURE 11 taken along line 13—13 of FIGURE 12.
FIGURE 18 is a perspective view of a portion of the mechanism shown in FIGURES 14 and 15, more fully illustrating structure for rotating a stator frame about its axis relative to a dummy field member.

In FIGURE 3, the dummy field member 48 is shown in position to receive coils while the dummy field member 50 is positioned to have coils transferred therefrom into a stator frame, designated S. For this purpose, the horizontal longitudinal axis of the winding mechanism B is placed at right angles to the horizontal longitudinal axis of the coil transferring mechanism C. These horizontal axes and the longitudinal axes of the dummy field members 48 and 50 are coplanar. The members 48 and 50 are mounted in opposite directions on their shafts or axles 60, and are symmetrically mounted with respect to the vertical center axis of the support post 40. As apparent from an inspection of FIGURE 3, if the support post 40 is rotated about its vertical center line through 180° in a clockwise direction, the dummy field member 48 will occupy the position occupied by the dummy field member 50 in FIGURE 3, and vice versa. Of course, in order to rotate the support post 40 and, accordingly, realign the dummy field members 48 and 50, it would be necessary to move portions of the mechanisms B and C from their positions shown in FIGURE 3. The manner in which this is accomplished will be described in connection with the detailed description of the mechanisms B and C. The mechanism for rotating or indexing the support post 40 continuously through increments of 180° is illustrated in FIGURES 1 and 2 and in greater detail in FIGURES 11, 12 and 13. As shown in FIGURE 12, the top of the support post 40 is journalled for rotation within an aperture 90 in the cover plate 46 by means of a bearing structure 92. Immediately above the cover plate 46, a spur gear 94 is mounted for rotation on the post 40 by means of a bearing structure 96. The gear 94 is driven by a rack 98 which in turn is driven by a rack actuator 100. As apparent, movement of the rack 98, as viewed in FIGURE 11, from the position shown therein to the right along a line perpendicular to the vertical axis of the support post 40 will cause the gear 94 to rotate in a clockwise direction while return movement of the rack 98 would drive the gear 94 in a counterclockwise direction. Rotation of the gear 94 in a clockwise direction, as viewed in FIGURE 11, is transmitted to the post 40 by means of a clutch mechanism including a clutch plate 102 mounted on the top of the post 40 and secured thereto as by welding. The clutch plate 102 is adapted to be engaged by a vertically projecting clutch pin or pawl 106 mounted within a spring housing 108 and biased upwardly through an aperture within a support plate 110 by means of a spring 112 located within the housing 108. The support plate 110 is secured to the gear 94 by means of pins 114 passing through aligned apertures therein and through aligned apertures in a spacer plate 116 whereupon the clutch pin or pawl 106 will rotate with the gear 94. A pair of recesses 118 are formed in the undersurface of the plate 102. Each recess 118 has a vertical shoulder 120 and an arcuate base 122. A locking pin or detent 124, which is driven by an actuator 126 is adapted to engage with a notch 128 cut in the outer periphery of the plate 102. There are two such notches 128 cut along a common diameter of the plate 102. The operation of this clutch mechanism is as follows.

Assuming the detent 124 to be retracted from the plate 102, movement of the rack 98 to the right, as viewed in FIGURE 11, causes clockwise rotation of the gear 94 whereupon the spring biased pin 106, which is engaged with the shoulder 120 of the recess 118 to the right in FIGURE 11, transmits this rotation to the plate 102. The rack 98 is designed to drive the gear 94, and accordingly, the plate 102 and post 40 through 180°. Actuation of the detent 124 positively prevents excess rotation of the plate 102. Subsequent movement of the rack 98 to the left, as viewed in FIGURE 11, does not affect the rotary position of the plate 102. The resulting counterclockwise movement of the gear 94 is not transmitted to the plate 102 since the pin 106 is cammed along the arcuate base 120 out of the recess 118. Of course, the energization of the actuator 100 is timed with the energization of the actuator 126 whereupon the locking pin or detent 124 is engaged with the notches 128 when the rack 98 is moved to the left but is disengaged when the rack 98 is moved to the right. As apparent, continued movement of the rack 98 to the left and then to the right will cause the post 40 repeatedly to rotate through 180° in a clockwise direction as viewed in FIGURES 3 and 11.

Figures 4, 5, 6, 16, 17:
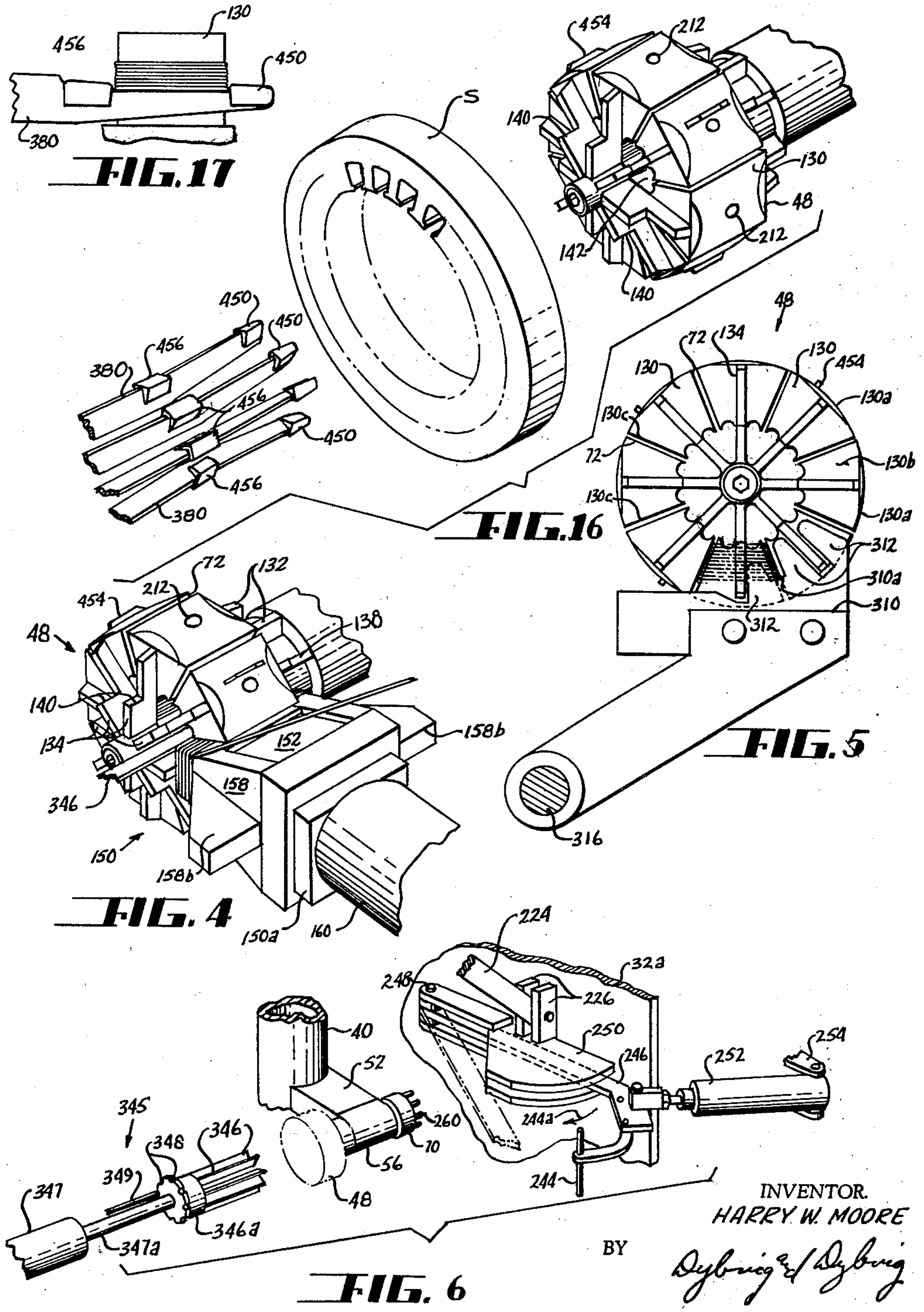
FIGURE 4 is a perspective view disclosing the manner in which a coil accumulator or dummy field member is wound with coils in accordance with this invention.
FIGURE 5 is a side elevational view of a dummy field member and a lead trap as viewed in the direction of arrows 5—5 of FIGURE 2.
FIGURE 6 is a partial perspective view of a portion of the machine made in accordance with this invention illustrating the relationship between a dummy field member, a coil side support member used to support coils during a winding operation and means for controlling the position of the wire used in winding coils on the dummy field member.
FIGURE 16 is a perspective view schematically illustrating the manner in which coils are transferred from a dummy field member into a stator frame using the mechanism shown more fully in FIGURES 14 and 15.
FIGURE 17 is an enlarged cross-sectional view indicating the manner in which a single coil wound upon a dummy field member is engaged by mechanism for removing the coil from a dummy field member.

Referring to FIGURES 3, 4 and 5, the dummy field member 48 includes a plurality of generally triangular coil forms or star pieces 130 having arcuate outer surfaces 130*a*, the combined arcuate surfaces 130*a* forming a conical surface. Each star piece 130 has parallel, planar lateral side faces 130*b* lying in planes transverse to the longitudinal axis of the field member 48. The upper and lower sides of the star pieces, designated 130*c*, extend radially outwardly from the longitudinal axis of the field member 48 and sides 130*c* of adjacent star pieces 130 are spaced to define the sides of the radially extending coil receiving slots 72. The star pieces 130 are supported by spaced, parallel pairs of inner and outer radially extending support spokes or flanges 132, 134 respectively. The pairs of flanges 132, 134 project along the center lines of the opposed sides 130*b* of the star pieces 130 and are connected thereto as by the pins 64 and by pins 136. The opposed outer sides of the flanges 132, 134 are tapered along their length, as shown best in FIGURE 3, and are provided with centrally located, horizontally outwardly projecting shoulders 138, 140 respectively, which aid in supporting the coil sides as will be discussed below. To enable removal of coils, as also discussed below, the radially innermost portions of the star pieces 130 are cut away along the length thereof on each side of their associated flanges 132, 134 whereby generally triangular openings 142 are formed centrally of the field member between adjacent pairs of flanges 132 and 134.

*Coil winding mechanism*

Figures 7, 8:
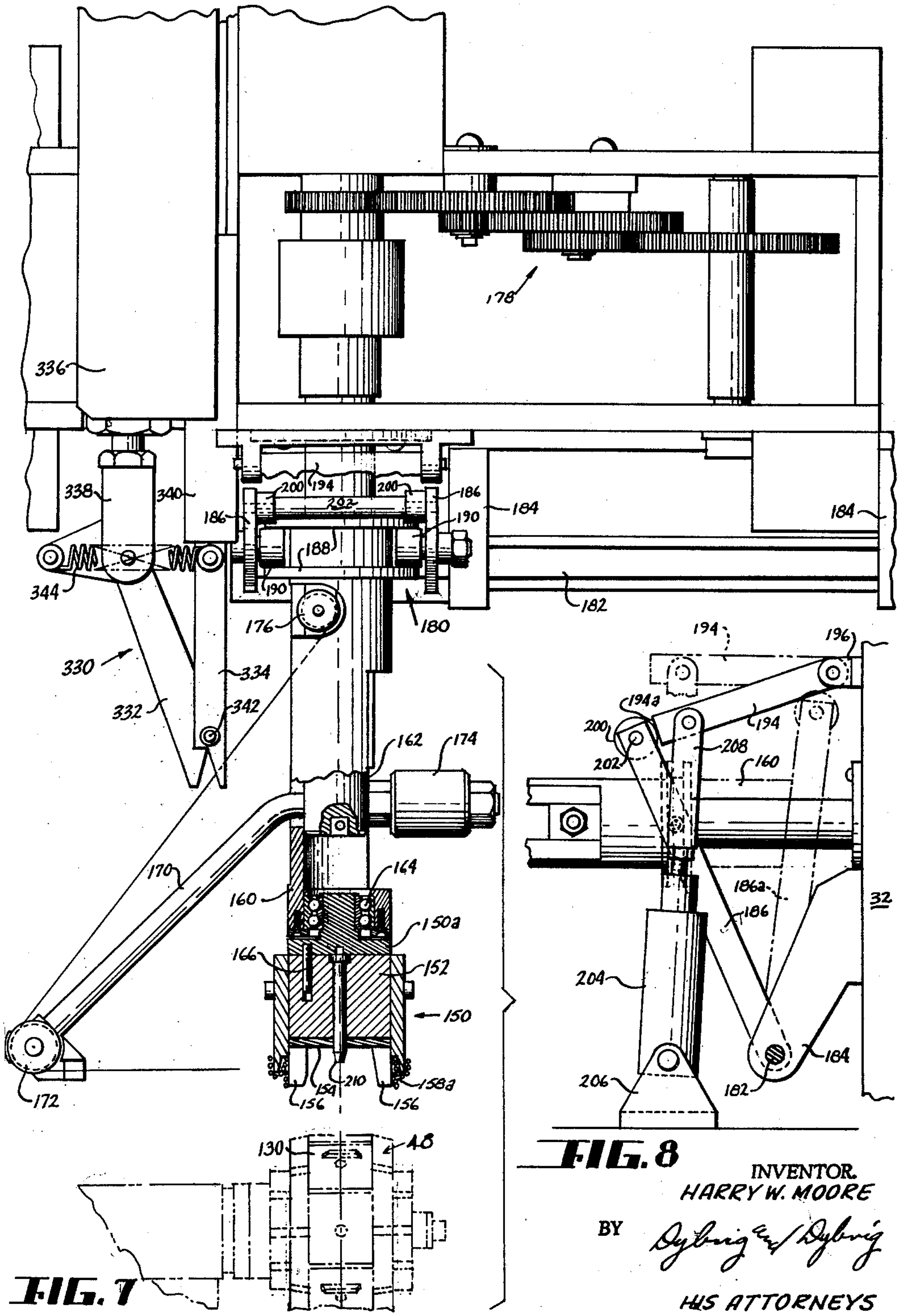
FIGURE 7 is a plan view, with portions broken away and in cross-section, of a flier mechanism and a winding form made in accordance with this invention for winding coils on a dummy field member.
FIGURE 8 is a side elevational view of a flier locking mechanism.

Referring to FIGURES 3, 4 and 7, the coil winding mechanism B for winding coils in the coil receiving slots 72 in the dummy field members 48 and 50 includes a winding form 150 having a center support block 152. Mounted on the forward or free end of the support block 152 nearest the dummy field member 48 is a coil form piece 154 having opposed pairs of inner side plates 156 adapted to straddle the sides of the member 48. The plates 156 are provided with center slots for straddling the flanges 132 and 134. A pair of parallel outer side plates 158 are attached to the sides of the support block 152, with the forward ends thereof overlying a portion of the inner side plates 156. The upper and lower surfaces of the side plate assembly formed by the inner side plates 156 and the outer side plates 158 are tapered such that when the winding form 150 is advanced into engagement with the dummy field member 48, as shown in FIGURE 4, the aforesaid upper and lower faces are generally coplanar with the radially projecting sides 130*c* of the star piece 130 against which the winding form 150 abuts. The forward end portions of the outer side plates 158 are undercut to provide notches 158*a* which, as will be discussed below, aid in forming coils within the coil receiving slots 72 of the dummy field member 48.

The winding form 150 is connected by a fixture 150*a* to a sleeve 160 mounted for sliding movement on a flier drive shaft 162. As shown in FIGURE 7, the fixture 150*a* is mounted for rotation within bearings 164 housed within the forward portion of the sleeve 160 and may be pinned to the form 150 as by pins 166.

A flier arm 170 is secured to the forward end of the flier drive shaft 162 and includes at its outer end the normal pulley and guide construction or flier head 172 for directing wire to the coil form. As conventional, the flier arm 170 may be counterbalanced by a weight 174. The path of the wire to the flier head 172 is not described in detail herein, but as usual includes a pulley 176 mounted for rotation on the shaft 162. Driving means (not shown) is connected to the drive shaft 162 to rotate the drive shaft about its longitudinal axis. The number of turns of wire in a coil is, of course, determined by the rotation of the flier arm 170. Conventional timing mechanisms, including a gear train 178, may be used to control the rotation of the arm 170. Since the mechanisms may be conventional, they are not described in detail herein. Opposed portions of the sleeve 160 are slotted along part of its length so that the sleeve 160 may slide relative to the flier arm 170 and the counterbalance 174.

The winding form 150 is separated from the dummy field member 48 when the flier arm 170 is at rest and is advanced into engagement with the dummy field member by means of a yoke mechanism, generally designated 180, which is connected to the rearward end of the sleeve 160. The drive for the yoke mechanism 180, as shown in FIGURES 7 and 8, includes a driven shaft 182 mounted for rotation in opposed apertures in a pair of brackets 184 which are secured to a portion of the supporting framework 32. The driven shaft 182 is driven by any suitable mechanism (not shown) adapted to rotate the shaft 182 intermittently through a predetermined number of degrees. The yoke, in this case, comprises a pair of arms 186 secured to the shaft 182 such that opposed, intermediate portions of the arms 186 straddle a pair of spaced, parallel annular flanges 188 on the sleeve 160. Mounted on the aforesaid intermediate portions of the arms 186 are a pair of horizontally disposed rollers 190 that are journalled for rotation thereon. The rollers 190 are located substantially on a common diameter of the sleeve 160 between the flanges 188. As apparent, if the shaft 182 is driven in a clockwise direction, as viewed in FIGURE 8, the arms 186 will rotate in a clockwise direction to the position designated by phantom lines 186*a*, whereupon the rollers 190 will force the sleeve 160 to move to the right in FIGURE 8, that is, to the position shown in FIGURE 7.

If desired, means may be provided for locking the winding form 150 in engagement with the dummy field member 48. As shown in FIGURES 7 and 8, such means may comprise a locking plate 194 mounted for rotation in a bracket 196 which is also secured to a portion of the supporting framework 32. When the sleeve 160 is in the retracted position shown in FIGURE 7 and in dotted lines in FIGURE 8, the locking plate 194 is in a horizontal position supported by a pair of rollers 200 mounted on a common axle 202, which in turn is journalled for rotation within apertures in the upper ends of the arms 186. As the arms 186 are moved forwardly, that is to the left from the position 186*a* shown in FIGURE 8, the locking plate 194 is permitted to pivot to its full line position. In the full line position, it will be noted that the forward face 194*a* of the locking plate 194 is engaged with the rear of the rollers 200 in such a manner that it is impossible for the arms 186 to rotate in a clockwise direction. When it is desired to retract the sleeve 160, that is, drive it to the right, as viewed in FIGURE 8, the locking plate 194 may be pivoted upwardly about the bracket 196 by means of an actuator 204 pivotally mounted upon a bracket 206 pivotally connected by a rod 208 to the plate 194. Accurate alignment of the coil form 150 with a star piece 130 is assured by means of a centrally located alignment pin 210 projecting forwardly from the support block 152 which projects into a cooperating alignment aperture 212 located centrally of the outer surface 130*a* of each star piece 130.

After the winding form 150 has been advanced into engagement with a star piece 130, the winding of a coil is initiated as follows. Referring to FIGURE 2, wherein a flier head 172 is designated by dotted lines, a length of wire, or coil lead, projecting from the head 172 is held against a pad 220 located above the dummy field member 48 by means of a roller 222 over which the wire is coursed. The roller 222 is positioned on the end of a lead pull arm 224 which is pivotally mounted upon brackets 226 secured to a support plate designated 32*a*. (See also FIGURE 6.) The rearmost end of the lead pull arm 224 is pivotally connected to a vertical rod 228 which is driven up and down along a vertical path by means of a compound lead pull actuator 230 supported on the cover plate 46 by brackets 232. The flier arm 170 is then driven in a clockwise direction, as viewed in FIGURE 2, so as to lay wire around the winding form 150.

As illustrated in FIGURE 4, wire W wound around the form 150 slides along the tapered upper and lower surfaces thereof. If desired, this sliding movement can be enhanced by mounting sharply tapered wings 158*b* to the sides of the plates 158. Since the side plate assembly formed by the plates 156 and 158 are stepped as illustrated in FIGURE 7, the wire not only slides along the upper and lower surfaces of the plates 156, 158, but also slides off the forward end of the plates 158 onto the lateral side faces of the plates 156. The resulting coil accordingly forms around the plates 156. Such coil formation is indicated schematically in FIGURE 7. The coil receiving slots 72 may be sufficiently wide to receive two pairs of coils. The particular field member 48 shown in the drawings has eight star pieces 130 and, accordingly, may receive eight coils, one on each star piece 130. Alternatively, it may be desired to load only four coils on the dummy field member, whereby coils will be wound on alternate star pieces 130. In the latter case, the coil on each star piece 130 can be wound double. Due to the unique construction of the form 150, wherein its side assembly has undercut notches 158*a*, a double coil may be wound simply by continued rotation of the flier arm 170 after a coil of a single thickness has been formed into the notch 158*a*, causing additonal wire to be wound over the coil initially formed. Of course, the second coil will not necessarily be wound evenly over the first. However, this does not affect the usefulness of the coil.

Immediately after the first coil has been wound in a pair of slots 72, the lead pull arm 224 is pivoted by energization of the actuator 230 to lower the roller 222 slightly below the pad 220, thereby releasing the coil lead from engagement with the pad 220. To insure that the wire is released, a lead depressor 234, having a plurality of prongs 236 projecting from the forward face thereof, is driven by an actuator 238 into engagement with the wire carried by the lead pull arm 224. It is thus apparent that there will be a length of wire projecting from the first coil being formed in the coil receiving slot 72. The flier drive is designed to stop the flier head 172 to the right side (FIGURE 2) of the dummy field member after each coil is wound. Thereafter, a vertical positioning pin 244 mounted upon an arm 246, which is pivoted at 248 to the framework 32*a* and guided by a pair of plates 250, is driven by an actuator 252 mounted upon brackets 254 in the direction of the arrow 244*a* shown in FIGURE 6 into engagement with the length of wire between the coil just formed in the dummy field member 48 and the flier head 172, whereupon additional wire is pulled from the flier. The positioning pin 244 may then be retracted to its initial position. Thereafter, the dummy field member 48 is indexed so as to present a different star piece 130 in position to be engaged by the coil form 150. Of course, before the member 48 can be indexed, the coil form 150 is withdrawn from its position of engagement with the member 48 shown in FIGURES 3 and 4 to that position shown in FIGURE 7.

The mechanism for indexing the dummy field member 48 is best illustrated in FIGURES 2, 3, 9 and 10. It will be noted that the indexing head 70 has a plurality of circumferentially spaced indexing pins 260 projecting rearwardly therefrom. The member 48 normally is held in fixed relation to its sleeve 58 due to the engagement of a pin receiving notch 262 in the forward face of a locking plate 264 with one of the indexing pins 260. (Note especially FIGURE 9.) The plate 264 is slidably mounted between an outer guide plate 268 which is connected by an end plate 270 in spaced, parallel relation to an inner guide plate 272 fastened to the support block 52. A spring 274 secured to the end plate 270 biases the locking plate 264 into locking engagement with a pin 260. The inner guide plate 272 is cut out to provide an aperture for a locking bar 276 adapted to move in a vertical path and normally biased upwardly, as shown in FIGURE 2, by a spring 278 secured to the base of the mounting block 52 and to a bracket 278*a* on the bar 276. The locking bar 276 has an arcuate recess 280 therein receiving a release pin 282 which is secured to the locking plate 264. The locking bar 276 may be moved from the position shown in FIGURES 3 and 9 by energization of a release actuator 284, shown in FIGURE 2, having a piston rod 286, which depends from the underside of the cover plate 46. The piston rod 286 is adapted to press down upon the top of the locking bar 276 whereupon the side of the recess 280 cams against the release pin 282 causing the locking plate 264 to move to the left, as viewed in FIGURE 3, out of engagement with the pins 260.

After the locking plate 264 is moved out of engagement with the pins 260, the member 48 may be indexed by actuation of an indexing pawl 290 mounted for pivotal movement on a slidable block 292 which is drivingly engaged by an indexing cylinder 294. (See FIGURES 3 and 10.) The movement of the block 292 is guided by a pair of guide rods 296 mounted on a bracket 298 secured to the support 32*a*. The indexing pawl 290 has a leg portion 290*a* which is biased by a spring 300 into flush engagement with a shoulder formed on the block 292. The spring 300 may be connected at one end to the pawl 290 and at its other end to an upright portion of the block 292. As apparent from inspection of FIGURE 10, movement of the pawl 290 to the left into the dotted line position designated 290*b* causes the pawl to engage one of the indexing pins 260. Continued movement of the pawl 290 to the left causes the indexing head and consequently the dummy field member 48 to rotate by amounts sufficient to place a different start piece 130 in position to receive coils from the coil form 150. After the dummy field member 48 has been so rotated, the piston 268 is withdrawn whereupon the locking bar 276 is again raised and the cover plate biased by the spring 274 back into engagement with another pin 260. The pawl 290 is then retracted or moved to the right as viewed in FIGURE 10. Since it is pivotal with respect to its support block 292 in a counterclockwise direction, its return movement, that is, from left to right as viewed in FIGURE 10, has no effect upon the position of the dummy field member 48. If coils are to be wound on alternate star pieces 130, the foregoing indexing operations are repeated to index an empty star piece 130 past the coil form 150. Thereafter, the coil form 150 is advanced into engagement with the dummy field member 48 and the flier arm 170 may now be rotated to form a new coil.

To insure that the coil previously wound will retain its shape and not be collapsed when the flier arm 170 begins to rotate, a pair of parallel, coil end support plates 310, one of which is shown in FIGURE 5, are fixedly secured to a shaft 316. As shown in FIGURE 2, the shaft 316 is mounted beneath the field member 48 upon a shaft or axle 318 rotatably mounted within a support sleeve 320. The shaft 318 may be rotated by an actuator rod 322 driven by an end support actuator 324 mounted on a bracket 326 attached to part of the supporting framework 32. When the plates 310 are pivoted upwardly into the position shown in FIGURES 2 and 5, a plurality of upwardly projecting coil end support fingers 312 formed thereon snugly engage the sides of the two star pieces 130 which have been indexed beyond the coil form 150. That is, the fingers 312 will be inserted between the coil ends and the lateral sides 130*b* of the star pieces 130. As apparent, the fingers 312 will prevent the coil wound around the star pieces from being tightened into engagement with the star pieces and thus reduced in size. If eight coils are to be loaded on the member 48, there will be two fingers 312 underneath the ends of the coil just wound. However, if only four coils are to be wound, the coil just wound would be located on the lowermost star piece 130 as shown in FIGURE 5. Only one finger 312 is essential to support this coil. The two additional fingers 312 would then insure that there is an adequate lead between successively formed coils.

A coil just wound may tend to unwind when the flier arm 170 begins to lay the subsequent coil. Accordingly, the plates 310 are provided with shoulders 310*a* that straddle one of the coil receiving slots 72 and force one side of the coil just formed down into the last mentioned slot 72. For this reason, the coil end support shoulders 138, 140 may not be adequate to prevent the coil sides from being forced into the triangular openings 142. Also, very fine wire may tend to fall into the openings 142 during the winding operation. Accordingly, a temporary coil side support member 345, shown best in FIGURES 2 and 6, is provided, comprising a plurality of horizontally projecting, radially mounted blades 346 supported on a head 346a which may be driven back and forth into and out of engagement with the dummy field member 48 by an actuator 347 having a piston rod 347a attached thereto. As the head 346a is advanced toward the member 48, the blades 346 enter the openings 142 and cover the radially innermost ends of the slots 72, thus providing a base for the coil sides. The head 346a is provided with a plurality of longitudinally extending guide notches 348 adapted to be engaged by a fixed guide rod 349 mounted in parallel relation to the piston rod 347a, so as to accurately align the blades 346 with the coil receiving slots 72. The length of the guide rod 349 is less than the throw of the head 346a so that the head 346a, when fully advanced toward the member 48, is free to rotate. In operation, the blades 346 are inserted into the openings 142 prior to the winding of the first coil on a dummy field member. During the entire operation of loading coils on the dummy field member, the blades 346 remain in the openings 142, rotating with the member 48 as it is indexed. After the last coil is wound, the blades 346 are retracted to permit the member 48 to be indexed or rotated to the coil transferring member C.

The foregoing operations are repeated until the desired number of coils have been wound upon the dummy field member 48. Thereafter, the lead pull arm 224 is pivoted from the full line position shown in FIGURE 2 to that shown by phantom lines 224a, such that the roller 222 will be located beneath the length of wire passing from the last coil wound on the field member 48 to the flier head 172. The lead positioning pin 244 is then advanced to cause a portion of this length of wire to be placed over the roller 222. The arm 224 is then pivoted upwardly by actuation of the cylinder 230 whereupon the wire is directed from the dummy field member 48 to the pad 220 back to the flier head 172.

The resulting length of wire between the field member 48 and the pad 220 is then cut by a cutting device 330, shown in FIGURE 7, including a pair of cutting arms 332 and 334. The arm 332 is advanced into engagement with the aforesaid length of wire by means of an actuator 336 connected thereto by a clevis 338. The arm 334 is mounted for sliding movement within a support block 340 and advances along with the arm 332 until the two arms are adjacent the aforesaid length of wire. Stop means (not shown) prevents further movement of the arm 334. The arms 332 and 334 are connected by a pivot pin 342 adjacent their forward cutting ends permitting the arm 332 to travel somewhat further than the arm 334 provided it pivots relative thereto, thereupon causing the wire to be cut. The cutter assembly 330 is then retracted. To prevent the arm 332 from pivoting too soon, it is biased relative to the arm 334 by a spring 344. After the cutting operation, the field member 48 may then be indexed by rotation of the support post 40 as already described so that the other field member 50 is positioned to be wound with coils. Since the length of wire directed from the flier is held by the roller 222 in engagement with the pad 220, all parts of the winding mechanism are positioned to repeat the foregoing operation for winding coils on the dummy field member.

*Coil transferring mechanism*

By rotation of the post 40 through 180° upon actuation of the rack 98 as described above, the dummy field member 48, which was positioned as shown in FIGURE 3 to receive coils, is now positioned at the location designated by the member 50 in FIGURE 3. The rotary position of the dummy field member 48 about its horizontal axis is fixed because the locking bar 276 rotates with the post 40 and remains biased upwardly by the spring 278. When positioned in front of the mechanism C, the coils loaded in the field member 48 are removed therefrom as described immediately below. Of course, it is to be understood that simultaneously with the removal of the coils from the dummy field member 48, coils will be wound in the coil receiving slots forming part of the dummy field member 50.

Figure 15:
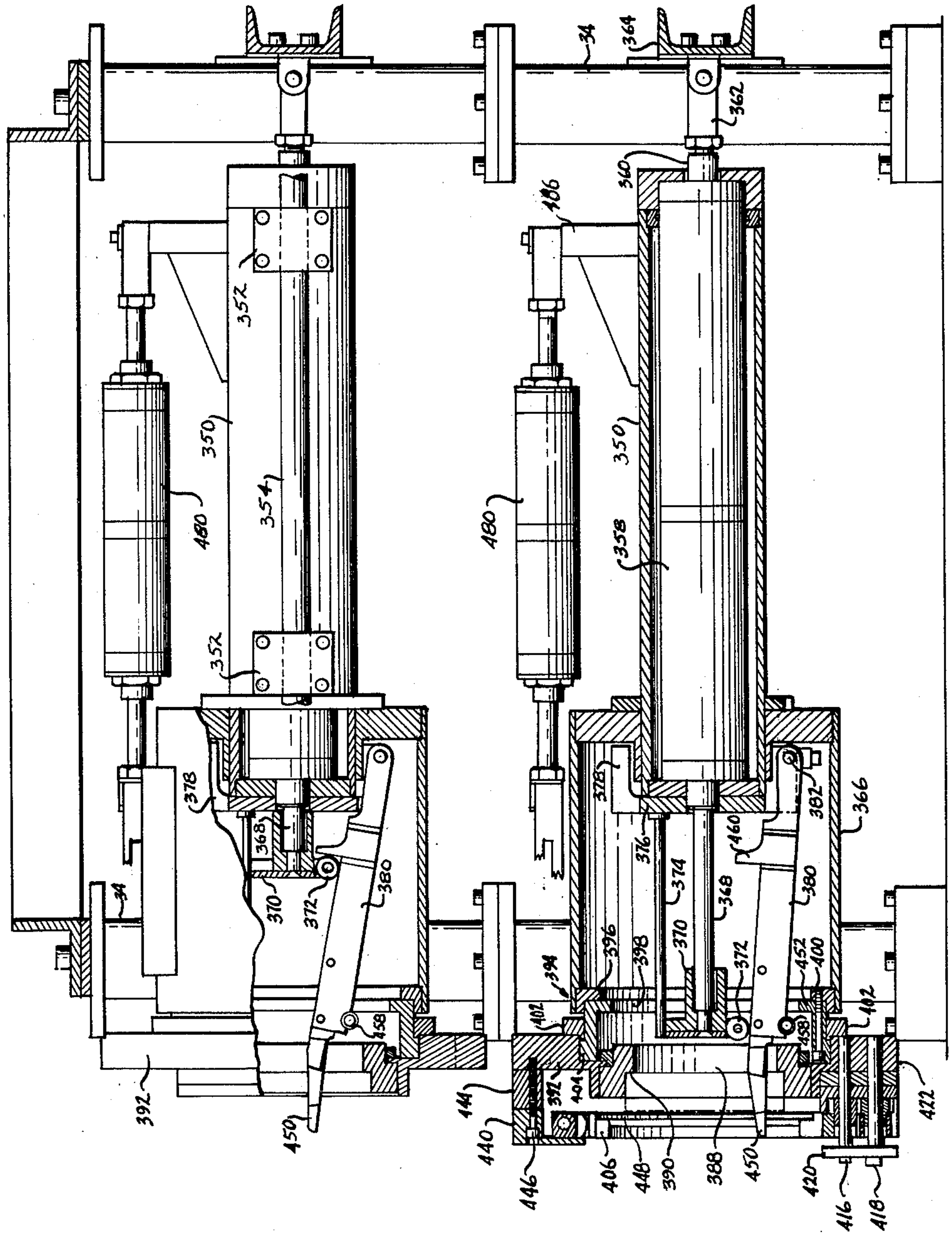
FIGURE 15 is a side elevational view of the structure shown in FIGURE 14, with portions broken away, as viewed in the direction of arrows 15—15 of FIGURE 1. The lower portion of FIGURE 15 is in cross-section, taken along line *15a*—*15a* of FIGURE 15.

Referring to FIGURES 1 and 15, each coil transferring mechanism C includes a cylindrical housing 350 having mounting blocks 352 projecting from opposed sides thereof receiving guide and support rods 354 attached by support blocks 356 to adjacent side support posts 34. The housing 350 encloses a compound air actuator 358 having a piston rod 360 projecting from its rearward end connected by a link 362 to a channel member 364 which in turn is fastened across a pair of rear support posts 34. Mounted upon the front end of the housing 350 is a second, larger, cylindrical housing 366 projecting forwardly therefrom, that is, to the left, as viewed in FIGURE 15, or to the right, as viewed in FIGURE 1. In addition to the forward portion of the housing 350, the housing 366 encloses a piston rod 368 projecting forwardly of the compound air actuator 358, to which a spider or support assembly 370 for a plurality of circumferentially spaced blade expanding roller elements 372 is secured. An anti-rotation guide rod 374 is attached at its rearward end to a blade support plate 276 and at its forward end is engaged within a notch formed in the forward portion of the spider 370. For purposes of comparison, the rod 374 for the lower unit is extended as shown in FIGURE 15, while the rod 374 in the upper unit is retracted. As will be made more apparent below, both rods 374 would normally be extended and retracted at the same time. Also, neither rod 374 would be extended unless its associated rod 360 were also extended.

The blade support plate 376, which is mounted centrally on the front end of the housing 350, includes a plurality of rearwardly extending fingers 378 upon which a plurality of longitudinally projecting blades 380 are pivotally mounted, as by pivot pins 382, in circumferentially spaced relation about the central axis of the stator supports. There are as many blades 380 as there are coil receiving slots 72 in the dummy field member 48. Therefore, in the embodiment illustrated in the drawings, there would be eight blades 380. Each roller 372 is engaged with the radially innermost surface of a blade 380. The function and structure of the blades 380 will be described in greater detail below.

A stator frame S is mounted upon the forward end of the housing 366 by means of a mounting ring adapter 388 having an intermediate, annular shoulder portion 390, against which the stator frame S abuts. The mounting ring 388 is secured to a rotatable ring assembly including a mounting ring 392 which is mounted for rotation about an annular support assembly 394 which, as shown in FIGURE 15, may include a first ring 396 connected in any suitable fashion to the front end of the inner wall of the housing 366 and a support ring 398 connected to the ring 396 as by means of a plurality of bolts 400. A retaining ring 402 connected to the mounting ring 392 serves to clamp the mounting ring 392 onto an annular flange 404 projecting radially outwardly from the forward edge of the ring 398.

Figure 14:
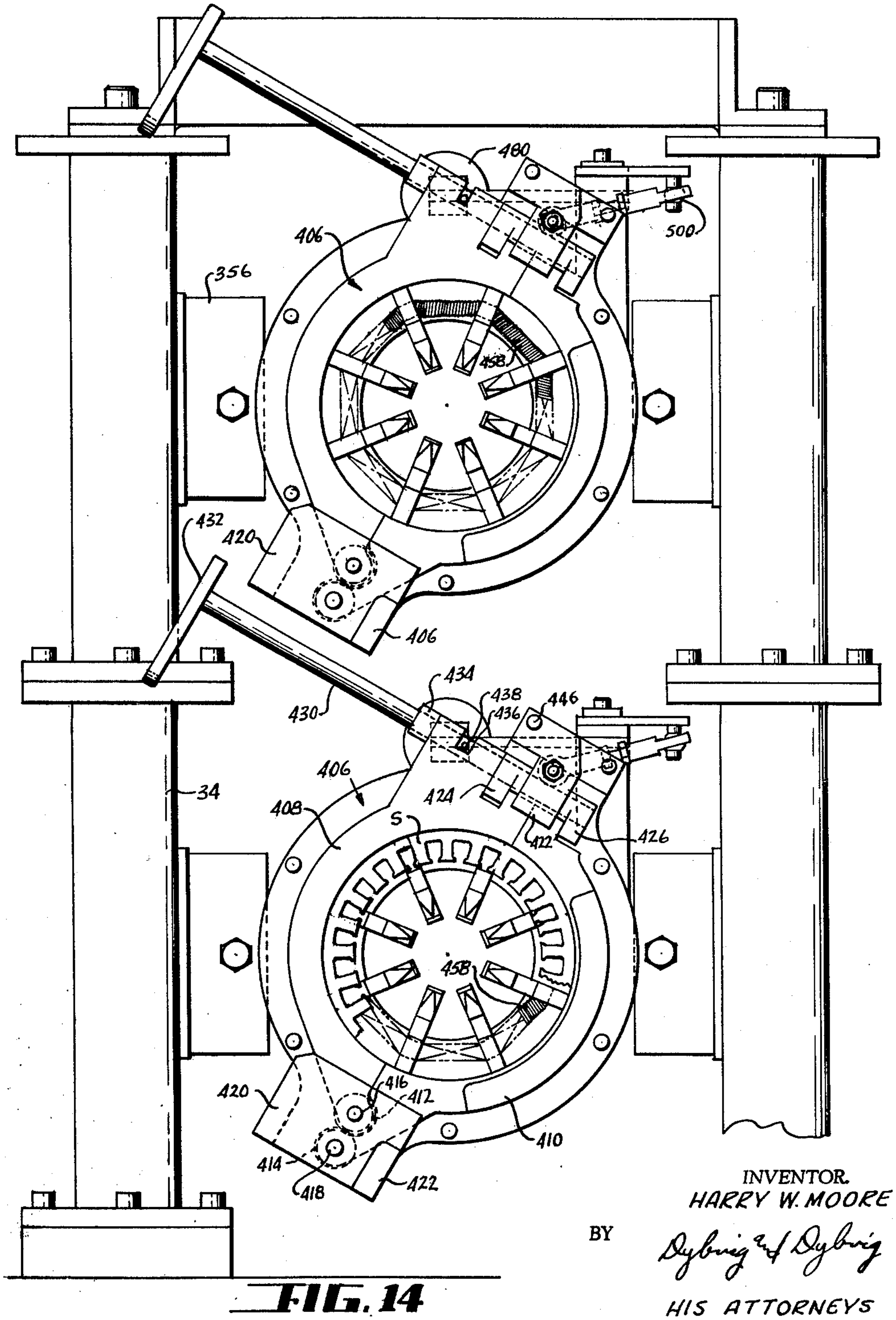
FIGURE 14 is an end elevational view of structure for mounting a stator frame and transferring coils wound on a dummy field member into coil receiving slots in stator frames, as viewed in the direction of arrows 14—14 of FIGURE 1.

The stator frame S is held in abutment with the shoulder portion 390 by a split back-up ring 406 (see FIGURE 14) comprising two ring halves 408 and 410, each of which have outwardly depending projections 412 and 414 respectively. The projections 412 and 414 are provided with meshing gear teeth so that when the ring half 408 is rotated in a counter-clockwise direction, as viewed in FIGURE 14, the ring half 410 will rotate in a clockwise direction about pivot pins 416 and 418 respectively. The pivot pins 416, 418 are held in fixed spaced relation by a guide plate 420 having apertures receiving the two pins and also by cooperating apertures in a radially projecting flange portion formed on the ring 392. The two ring halves 408, 410 are clamped together by a pair of downwardly extending lugs 424, 426 engaged with opposed shoulder portions formed on the ring halves. The lugs 424, 426 may be integral with a sleeve 428 which is pinned to a locking rod 430 having a handle 432 adapted to pivot the lugs 424, 426 out of engagement with the cooperating shoulders on the ring halves 408 and 410. The locking rod 430 passes through an aperture in an upwardly projecting plate portion of the ring half 408 and is held in fixed relation thereto by a collar 434 and the sleeve 428. A notch 436 may be cut in the upwardly projecting portion of the ring 408 and the rod 430 may be provided with a spring roll pin 438 for limiting the rotary movement of the rod 430. A retaining plate 440 which, as shown in FIGURE 15, is held in spaced relation to an upwardly projecting portion 442 formed on the ring 392 by a spacing member 444 and connected thereto by a plurality of bolts 446, overhangs the ring halves 408, 410, thus holding the ring halves in fixed spaced relation to the ring 392. The back-up ring 406 may be provided with stator-engaging adapter ring halves 448, there being two such adapter ring halves 448, each being pivotal with one of the ring halves 408 and 410. The rear faces of the adapter ring halves 448 abut the front face of a stator frame, thus retaining the stator frame S in abutment with the shoulder 390. Rotation of the rod 430 so as to move the lugs 424, 426 out of engagement with the ring halves 408, 410 and subsequent movement of the rod 430 to the left, as viewed in FIGURE 14, will cause the ring halves 408, 410 to separate by an amount sufficient to permit insertion or removal of a stator frame S. A stator frame S is held in a predetermined fixed relation with respect to the mounting ring adapter 388 by means of cooperating notches and pins or the like (not shown) as will be apparent to the skilled in the art.

The operation of the transferring mechanism as thus far described is as follows. Referring to FIGURES 1, 3 and 15, after the dummy field member 48 is moved to occupy the position occupied by the dummy field member 50 in FIGURE 3, the rearward half of the compound air actuator 358 is energized, forcing the housings 350 and 366 forwardly, such that the dummy field member 48 is received within the center opening of the stator frame S. To assure alignment between the dummy field member 48 and the coil receiving slots in the stator frame S, radially projecting keys 454 are mounted on alternate star pieces 130, which keys project into spaced coil receiving slots in the stator frame S. At this time, the blades 380 occupy the position illustrated in FIGURE 3 and in the top half of FIGURE 15. As illustrated in FIGURE 3, the forward ends of the blades 380 have passed into the dummy field member. As already noted, the star pieces 130 of the dummy field member 48 are cut away adjacent the centers thereof so as to form generally triangular openings 142. As shown best in FIGURES 16 and 17, the openings 142 are adapted to receive generally triangular enlarged head portions 450, formed on the front ends of the blades 380. Each blade 380 is aligned with one of the coil receiving slots 72 of the dummy field member and this alignment is assured due to the manner in which the triangular blade head portions 450 pass through the openings 142. In addition, the position of the blades may be controlled by notches (not shown) cut in the edge of a radially inwardly projecting flange 452 formed on the ring 398.

After the stator frame S has been advanced to the position shown in FIGURE 3, wherein it is in surrounding relation to the dummy field member, the forward ends of the blades 380 are projected radially outwardly so as to force the coils located in the dummy field member into the slots in the stator frame S. This is accomplished by actuation of the forward portion of the compound air actuator 358, which causes the rod 368 to be projected outwardly, whereupon the roller elements 372, which are engaged with the radially innermost faces of the blades 380, travel forwardly along the length thereof causing the blades 380 to pivot about the pivot pins 382, whereupon the forward ends of the blades 380 are expanded radially outwardly.

As shown in FIGURE 17, each of the blades is provided with a trailing, triangular shaped flange portion 456, which is spaced forwardly of a coil wound upon one of the star pieces 130 while the enlarged head portion 450 is spaced beyond the rearward end of the coil. As the blades 380 pivot, causing their forward portions thereof to move generally radially outwardly, the blade portions 450, 456 prevent the end portions of the coil from slipping to one side or the other, especially as the bottom edge of the coil is being transferred into one of the slots in the stator frame S. Of course, it is apparent that the forward end of the blades 380 cannot move precisely radially outwardly. It is for this reason that the sides of the star piece support flanges or spokes 138, 140 are tapered.

After the coils have been transferred from the dummy field member to the stator frame, the rod 368 is retracted whereupon the blades 380 pivot such that their forward ends return radially inwardly to the position shown in FIGURE 3 and in the top half of FIGURE 15. To insure that this pivotal movement takes place, an annular spring ring 458, engaged within notches along the outer edges of the blades 380, biases the forward ends of the blades inwardly. In addition, each blade is provided with a radially inwardly projecting flange 460 adjacent its inner end which is engaged by the roller 372 associated therewith, thus forcing the forward ends of the blade 380 to pivot inwardly. Of course, the blades 380 must pivot inwardly before the housings 350 and 366 are withdrawn. Otherwise, the enlarged head portions 450 of the blades 380 would jam against the sides of the dummy field member. Thereafter, the piston rod 360 is retracted into the right half of the compound air actuator 358, as viewed in FIGURE 15, causing the parts of the coil transferring mechanism to return to a rest position.

During the coil winding operation previously described, the coil leads were formed so as to extend to that side of the dummy field member 48 which is attached to its support shaft or axle 60. Accordingly, the coil leads project to the side opposite the coil transferring mechanism C when the member 48 is positioned for transfer of the coils to the stator frame, and do not interfere with the transfer operation. To assure that the leads for coils inserted in the stator slots do not interfere with the transfer of subsequent sets of coils, a lead wiper arm 462 (FIGURE 1) is pivotally mounted above the housing 366, and to the rear of a dummy field member positioned thereby, upon a wiper shaft 464 journalled for rotation on support pieces 466 secured to a bracket 468. The shaft 464 is connected by a yoke 470 thereon to a piston rod 472 which forms part of a wiper actuator 474 supported by the platform 30. In operation, the wiper arm 462 is normally pivoted out of the path of movement of the members 48 and 50. Immediately after a dummy field member loaded with coils is positioned adjacent the mechanism C, the wiper arm 462 is pivoted toward the post 40, whereupon it will be positioned to the rear side, as viewed in FIGURE 1, of the lead wires projecting from the dummy field member. After the housing 366 is advanced to place the stator frame S in surrounding relation to the dummy field member, the wiper arm 462 is pivoted back to its initial position, forcing the coil leads to lie against the side of the back-up ring 406, away from the center portion of the stator frame. If desired, a hook or the like (not shown) may be mounted on the exposed face of the ring 406 to prevent the coil leads from springing away therefrom.

As mentioned earlier, each dummy field member will normally be loaded with coils forming one phase of a multi-phase stator winding. Assuming the completed stator is to be a three-phase stator, each phase having four coils, there will be four coils loaded on the dummy field member 48 and, accordingly, four colis transferred to the stator frame S upon each operation of the transferring mechanism C. Of course, coils for the second and third phases must be inserted in pairs of stator slots different from those in which the first phase coils are inserted. Accordingly, relative rotation must be induced between the dummy field members and the stator frame S. Referring to FIGURES 15 and 18, relative rotation between a stator frame S and the dummy field member is accomplished by indexing the ring 392 through the required number of degrees prior to each actuation of the left side of the compound air actuator 358. Indexing of the ring 392 is accomplished by means of a compound indexing cylinder 480 having a rear piston rod 482 connected to a support bracket 486 mounted on top of the housing 350. The cylinder 480 is also provided with a forward piston rod 488 by a clevis 492 which receives one end of a generally L-shaped arm 494, the mid-portion of the leg of which is pivotally attached by a pivot pin 496 to a mounting block 498 secured to the top of the housing 366. The free end of the elongated arm portion of the L-shaped arm 494 is pivotally connected by a pivotal joint 500 to a link 502 which in turn is pivotally connected to a horizontally projecting pin 506 which extends rearwardly from the top of the ring 392. In FIGURE 18, the piston rods 482 and 488 are projected outwardly from both ends of the cylinder 480. Accordingly, the arm 494 is pivoted to one extreme position. Retraction of the rod 482 within the rearward end of the cylinder 480 would cause the pin 506 to move to the position designated by phantom lines 506*a*, consequently rotating the ring 392. Similarly, retraction of the piston rod 488 into the forward end of the cylinder 480 would cause the pin 506 to move to the position designated 506*b* and consequent further rotation of the ring 392.

The operation of the machine described above is entirely automatic, but for insertion and removal of the stator frames. Even this latter feature could be automated by known stator frame handling methods. By supporting the dummy field members 48 and 50 for rotation about a vertical post, the operation of the mechanism is quite efficient, since both members 48 and 50 are in almost constant use. The machine is also quite compact since the path of movement of the members 48 and 50, which is entirely rotational, is minimal.

The machine is especially compact since it is capable of winding more than one stator simultaneously. In the embodiment illustrated in the drawings, the machine is adapted to wind two stators at one time. Of course, by stacking additional mechanisms B and C above those shown in the drawings, three or more stators could be wound simultaneously. In addition to being compact, a reduction in the number of parts is achieved. Several of the control mechanisms for both sets of winding mechanisms have common parts. For example, the single post 40 supports both upper and lower pairs of members 48 and 50 such that they are aligned one above the other; the actuator 324 drives the vertical actuator rod 322 for both the upper and the lower coil side support members 310; the actuator 230 is connected by the vertical rod 228 to both lead pull arms 224; the single pair of locking bars 276 lock both the upper and lower members 48 and 50, and are pushed downwardly by the single actuator 284; and both lead wiper arms 462 may be driven by the actuator 474. For this latter purpose, a vertical connecting member 512 interconnects the piston rod 472 and the upper wiper shaft 464.

All of the actuators mentioned above may be either pneumatic or hydraulic pistons and cylinders. Pneumatic actuators have been found the most desirable. All of the actuators may be controlled automatically from a control panel 514 as will be understood by those skilled in the art. To simplify the drawings, the air lines for the various actuators have been omitted. Also, the timing mechanisms for controlling the various operations have been omitted, since the structure, function and design of such mechanisms are well known. One example of a suitable timing device is shown in FIGURE 1, and includes a timing gear 516 engaged with a sensing switch arm 518. An arrowhead 522 attached to the housing 350 engages and rotates the gear 516 each time the housing 350 is advanced toward a dummy field member. The switch arm 518 thereby actuates a sensing switch 520 which controls the operation of the indexing cylinders 480. In this regard, it may be noted that, for ease of operation, the timing of the upper and the lower cylinders 480 may be such that the loading of the two stators may be out of phase. For example, the stator in the lower unit may be about to receive its first set of coils while the stator in the upper unit is about to receive its last set of coils. Only one operator would then be needed to insert and remove the stator frames, yet the mechanism may continue to operate without pause.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a coil winding machine, a support post; means mounting said post for rotation about a vertical axis; at least one coil receiving dummy field member mounted on said support post; at least one coil winding mechanism mounted adjacent said post for winding coils on said dummy field member; at least one coil transferring mechanism mounted adjacent said post for transferring coils from said dummy field member to a stator frame; and indexing means engaged with said post adapted to rotate said post selectively to align said dummy field member with said coil winding mechanism and said coil transferring mechanism.

2. The structure of claim 1 in which said dummy field member is mounted for rotation about a horizontal axis on said support post, said member having pairs of circumferentially spaced coil receiving slots, and wherein means are provided to rotate said member about said horizontal axis to position empty pairs of coil receiving slots to receive coils from said winding mechanism.

3. In a coil winding machine, a support post; means mounting said post for rotation about a vertical axis; at least one pair of coil receiving dummy field members mounted on said support post, said members being symmetrically located on opposite sides of the axis of rotation thereof; at least one coil winding mechanism mounted adjacent said post for winding coils on said dummy field members; at least one coil transferring mechanism mounted adjacent said post in spaced relation to said winding mechanism for transferring coils from said dummy field member to a stator frame; said members and said mechanism being so constructed and arranged that one of said members is positioned to be wound with coils while the other of said members is positioned to have coils removed therefrom; and indexing means engaged with said post adapted to rotate said post to reverse the position of said dummy field members with respect to said coil winding mechanism and said coil transferring mechanism.

4. The structure of claim 3 wherein said indexing means intermittently advances said post through 180° to reverse the positions of said members.

5. The structure of claim 3, wherein said coil transferring mechanism has stator frame support means connected therewith, and further including means causing rotation of a stator frame held by said support means about its axis after each operation of said transferring mechanism.

6. In a coil winding machine, a support post; means mounting said post for rotation; at least two coil receiving dummy field members mounted on said support post in longitudinally spaced relation; at least two spaced coil winding mechanisms, there being one winding mechanism adjacent each dummy field member; at least two spaced coil transferring mechanisms, there being one coil transferring mechanism adjacent each dummy field member; and indexing means engaged with said post adapted to rotate said post selectively to align said dummy field members with said coil winding mechanisms and said coil transferring mechanisms.

7. The structure of claim 6 in which said dummy field members are mounted for rotation on said support posts, each dummy field member having pairs of circumferentially spaced coil receiving slots, and wherein means are provided to rotate each of said dummy field members to position empty pairs of coil receiving slots to receive coils from said winding mechanisms.

8. The structure of claim 7 wherein lock means maintain each dummy field member in a fixed position while coils are being wound thereon by said coil winding mechanism, and release means is provided to release said lock means from said field members.

9. The structure of claim 8 wherein said release means includes an elongate bar supported by said post, and engaged with the lock means associated with both of said dummy field members.

10. The structure of claim 6 wherein there are at least two pairs of longitudinally spaced dummy field members mounted on said support post, the two dummy field members of each pair being mounted on opposed sides of said post, said coil winding mechanisms and said coil transferring mechanisms being so arranged with respect to said post that one dummy field member of each pair is being wound with coils while the other dummy field member of each pair is positioned to have coils removed therefrom.

11. The structure of claim 10 wherein said indexing means rotates said post through substantially 180° upon each operation thereof whereby the positions of said dummy field members forming each pair are intermittently reversed with respect to said coil winding mechanism and said coil transferring mechanism.

12. In a coil winding machine, the combination comprising: a dummy field member having pairs of coil receiving slots, support means mounting said member on a horizontal axis, indexing means intermittently rotating said support means and said dummy field member about a vertical axis; a flier mechanism rotatable about a horizontal axis including a winding form for loading coils in said pairs of coil receiving slots; stator frame support means for mounting a stator on a horizontal axis coplanar with the horizontal axis of rotation of said flier, said indexing means rotating said support means from a first position, wherein said flier lays coils in said pairs of slots, to a second position, wherein said dummy field member is supported adjacent said stator frame support means; means movably mounting said stator frame support means for moving a stator frame held thereby into encircling relationship to said dummy field member; and transfer means for transferring coils from said dummy field member into coil receiving slots within said stator frame.

13. The combination of claim 12 including means causing rotation of a stator frame held by said stator frame support means about its axis after each operation of said transfer means, whereby the coils forming one phase for the stator frame are inserted into the coil receiving slots therein, the stator frame thereafter being rotated to present different pairs of slots for reception of coils for another phase.

14. In a coil winding machine, the combination of a support post, a mounting block connected to said post, a sleeve on said mounting block, a shaft rotatably received within said sleeve, a dummy field member mounted on one end of said sleeve, said dummy field member having pairs of coil receiving slots therein, an indexing head mounted on the other end of said sleeve having a plurality of pins projecting rearwardly therefrom, there being as many indexing pins as coil receiving slots in said dummy field member, a locking plate slidably supported by said support block, said locking plate having a notch therein for receiving one of said indexing pins, means biasing said support plate into a position wherein one of said pins is received within said notch, release means connected with said locking plate for moving said plate out of engagement with said pin, and pawl means for engaging said pins and adapted to move into engagement therewith causing said indexing head to rotate.

15. The combination of claim 14 wherein said release means includes an elongate bar slidably carried by said support block for movement along an axis transverse to the path of movement of said locking plate, said locking plate being provided with a pin positioned in the path of movement of a cam surface on said bar.

16. The combination of claim 15 wherein means biases said elongate bar into a first position out of engagement with said release pin and release means positioned for engagement with said elongate bar is provided to move said elongate bar into engagement with said release pin.

17. The combination of claim 16 wherein said support post is rotatable about a vertical axis, said bias means and said elongate bar being supported for rotational movement with said support post from a position in which said elongate bar may be engaged by said release means to a position spaced from said release means.

18. In a coil winding machine, the combination comprising: a dummy field member having a plurality of circumferentially spaced coil receiving star pieces, said star pieces having tapered upper and lower sides and generally parallel lateral sides, the tapered sides of one star piece being spaced from the tapered sides of adjacent star pieces whereby radially extending coil receiving slots are formed between said star pieces, the radially innermost faces of said star pieces defining central openings projecting along a longitudinal axis of said dummy field member, said openings communicating with the slots formed between adjacent star pieces, coil end support means connected to the sides of said star pieces for supporting the ends of coils wound thereon; means for indexing said field member to present different pairs of coil receiving slots in a position to receive coils from a winding form; and coil side support means temporarily blocking the radially innermost ends of the coil receiving slots to prevent coils from falling into the openings in the field member.

19. The structure of claim 18, wherein said coil side support means comprises a plurality of elongate blades, means mounting said blades about the longitudinal axis of said field member, said last mentioned means including an actuator adapted to move said blades along said axis whereby said blades may be inserted within said openings or retracted therefrom, said blades being mounted for rotation upon said mounting means whereby said blades will rotate as said dummy field member is indexed.

20. In a coil winding machine, a winding form used in laying wires into coil receiving slots formed between tapered radially extending sides of adjacent star pieces of a dummy field member, the wire being wound by a flier around said winding form, the winding form including a pair of lateral side plate assemblies adapted to straddle the sides of that star piece about which a coil is to be wound, said side plate assemblies having upper and lower surfaces generally coplanar with the radially extending sides of the last mentioned star piece, the forward ends of said side plate assemblies being stepped such that the extreme forward end of the winding form is narrower than the rearward end thereof, whereupon wire wound upon the wider portion thereof slides therealong onto the narrower portion and subsequently onto the sides of said star piece, the wider portion thereof being undercut to form a notch for the formation of a coil therein whereupon a coil is first formed along the forward end thereof and into said notches upon operation of said flier, continued operation of said flier causing wire to be laid over said first formed coil.

21. In a coil winding machine of the type utilizing a dummy field member having a plurality of pairs of radially extending coil receiving slots in which coils are inserted and a stator frame is supported in encircling relation to said dummy field member, a coil transferring mechanism comprising a plurality of blades, there being as many blades as coil reeciving slots in said dummy field member; means pivotally mounting each of said blades adjacent one end thereof in circumferentially spaced relation one to the other about a common axis; means biasing the other ends of said blades toward one another; blade expansion means slidably engaged with the radially innermost edges of said blades; actuator means engaged with said expansion means to move said expansion means along said axis over a portion of the length of said blades, said other ends of said blades being moved radially outwardly as said blade expansion means slides along said blades toward said other ends thereof.

22. The structure of claim 21 wherein said blade expansion means includes a plurality of roller elements, there being one roller element engaged with each blade.

23. In a coil winding machine, the combination comprising: a dummy field member having a plurality of radially extending coil receiving slots adapted to be loaded with coils; a coil transferring machanism adapted to transfer coils from said dummy field member to a stator frame; support means mounting said dummy field member adjacent said coil transferring mechanism; said coil transferring mechanism including a stator support, means movably mounting said stator support whereby a stator frame supported thereby can be moved into surrounding relation to said dummy field member, a plurality of blades, there being as many blades as coil receiving slots in said dummy field member, means pivotally mounting each of said blades adjacent one end thereof in fixed spaced relation to said stator support, said blades being at said one end thereof in circumferentially spaced relation one to the other about a common axis, means biasing the other ends of said blades toward one another, said other ends of said blades moving into the radially innermost portions of said coil receiving slots as a stator frame is moved into surrounding relation to said dummy field member, and means to move said other ends of said blades substantially radially outwardly to transfer coils from the dummy field member to slots in the stator frame.

References Cited by the Examiner

UNITED STATES PATENTS

| | | | |
|---|---|---|---|
| 2,814,096 | 11/57 | Hebrecht | 29—205 |
| 2,934,099 | 4/60 | Mason | 242—1.1 |
| 3,036,603 | 5/62 | Moore | 140—92.1 |

FOREIGN PATENTS

| | | |
|---|---|---|
| 357,696 | 12/61 | Switzerland. |

CHARLES W. LANHAM, *Primary Examiner.*